US011635920B2

(12) United States Patent
Hogan et al.

(10) Patent No.: US 11,635,920 B2
(45) Date of Patent: Apr. 25, 2023

(54) ENABLING MULTIPLE STORAGE TIERS IN A HYPERCONVERGED INFRASTRUCTURE (HCI) CLUSTER

(71) Applicant: VMware, Inc., Palo Alto, CA (US)

(72) Inventors: Cormac Hogan, Cork (IE); Frank Denneman, Purmerend (NL); Duncan Epping, Helmond (NL)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/190,898

(22) Filed: Mar. 3, 2021

(65) Prior Publication Data

US 2022/0283748 A1    Sep. 8, 2022

(51) Int. Cl.
*G06F 3/00* (2006.01)
*G06F 3/06* (2006.01)
*G06F 9/455* (2018.01)

(52) U.S. Cl.
CPC .......... *G06F 3/0665* (2013.01); *G06F 3/0604* (2013.01); *G06F 3/067* (2013.01); *G06F 3/0614* (2013.01); *G06F 3/0635* (2013.01); *G06F 3/0683* (2013.01); *G06F 9/45558* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 11,068,162 B1 * | 7/2021 | Meister | G06F 3/067 |
| 11,461,191 B2 * | 10/2022 | Denneman | G06F 11/1469 |
| 2021/0397356 A1 * | 12/2021 | Cain | G06F 3/0631 |

* cited by examiner

*Primary Examiner* — Midys Rojas

(57) ABSTRACT

In certain embodiments, a computer system can create first and second pluralities of disk groups in a hyperconverged infrastructure (HCI) cluster, where each disk group in the first plurality has capacity storage devices of a first type and each disk group in the second plurality has capacity storage devices of a second type. The computer system can further tag each disk group in the first plurality with a first disk group tag, tag each disk group in the second plurality with a second disk group tag, and create a storage policy that includes a placement rule identifying the first disk group tag. Then, at a time of provisioning a virtual machine (VM) in the HCI cluster that is associated with the storage policy, the computer system can place the VM on one or more of the first plurality of disk groups in accordance with the placement rule identifying the first disk group tag.

21 Claims, 8 Drawing Sheets

Create Category

Category Name: DiskGroupType

Description: A tag for selecting disk groups with different types of storage

Tags Per Object: ● One tag  ○ Many tags

Associable Object Types:
- ☐ All objects
- ☐ Folder
- ☐ Datastore
- ☒ Disk Group

[CANCEL] [CREATE]

*FIG. 5*

Create Tag

Tag Name: Fast-DG

Description: Tag to associate with disk group comprising of fast capacity storage devices Category: DiskGroupType →

[CANCEL] [CREATE]

*FIG. 6*

Tag Based Placement

Rule 1

Tag Category: | DiskGroupType → |

Usage Option: | Use storage tagged with → |

Tags: | Fast-DG × |

| BROWSE TAGS |

| ADD TAG RULE |

*FIG. 9*

ENABLING MULTIPLE STORAGE TIERS IN A HYPERCONVERGED INFRASTRUCTURE (HCI) CLUSTER

BACKGROUND

Unless otherwise indicated, the subject matter described in this section is not prior art to the claims of the present application and is not admitted as being prior art by inclusion in this section.

Hyperconverged infrastructure (HCI) is an IT infrastructure model that virtualizes the compute, storage, and networking resources of a cluster of host systems and allocates these virtualized resources to workloads such as virtual machines (VMs). For example, with respect to storage, HCI enables host-side storage devices—which are organized and managed in the form of logical groupings known as disk groups—to be aggregated into a cluster-wide virtual storage pool. Upon being created, this virtual storage pool can be used as a storage backend for holding the persistent data (e.g., objects/components) of VMs provisioned in the HCI cluster.

In existing HCI platform implementations, the disk groups that collectively form an HCI cluster's virtual storage pool are assumed to be composed of capacity storage devices that exhibit the same or generally similar performance characteristics, and thus the virtual storage pool as a whole is consumed as a single tier (i.e., performance level) of storage. This means that it is currently not possible to place VMs (or more precisely, place their persistent data objects/components) on different storage tiers within a single HCI cluster, which can be problematic if the VMs have divergent storage performance requirements.

BRIEF DESCRIPTION OF THE DRAWINGS

FIG. 5 depicts a tag category creation UI according to certain embodiments.

FIG. 6 depicts a tag creation UI according to certain embodiments.

FIG. 9 depicts a tag placement rule creation UI according to certain embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

The present disclosure is directed to a framework for enabling multiple storage tiers in an HCI cluster, where each storage tier corresponds to a set of disk groups in the HCI cluster that provides a distinct level of storage performance. For example, the multiple storage tiers can include a first "slow" storage tier that corresponds to a first set of disk groups comprising capacity magnetic (i.e., spinning) disks, a second "medium" storage tier that correspond to a second set of disk groups comprising capacity PCIe-based solid-state disks (SSDs), and a third "fast" storage tier that corresponds to a third set of disk groups comprising capacity NVMe-based SSDs or persistent memory (PMEM) modules. With this framework, an organization that runs VMs on the HCI cluster can ensure that each of its VMs is placed on a storage tier whose performance characteristics best match the VM's storage requirements, resulting in improved VM performance and more efficient storage utilization across the cluster.

In one set of embodiments, the framework of the present disclosure includes four modules: (1) a disk group tag creation module, (2) a disk group creation and tagging module, (3) a disk group tag-aware storage policy creation module, and (4) a disk group tag-aware VM provisioning module. Module (1) allows for the creation of metadata tags, referred to herein as disk group tags, that identify different types of disk groups in an HCI cluster that exhibit different levels of storage performance (e.g., "Slow-DG" tag, "Medium-DG" tag, "Fast-DG" tag, etc.). These disk group tags can also be understood as storage tier identifiers because they represent different possible tiers of storage in the HCI cluster. Module (2) allows for the creation of disk groups comprising different kinds of capacity storage devices (e.g., a first disk group comprising capacity magnetic disks, a second disk group comprising capacity PCIe-based SSDs, etc.) and the tagging of each disk group using a disk group tag that is appropriate for the performance level of the disk group's capacity storage devices. Module (3) allows for the creation of VM-level storage policies that include rules for placing VMs on disk groups that have been tagged with specific disk group tags. And module (4) carries out the automatic placement of VMs in accordance with the VM's storage policies and corresponding disk group tag placement rules. These and other aspects are described in further detail below.

2. Example HCI Environment and Solution Architecture

Figure 1:
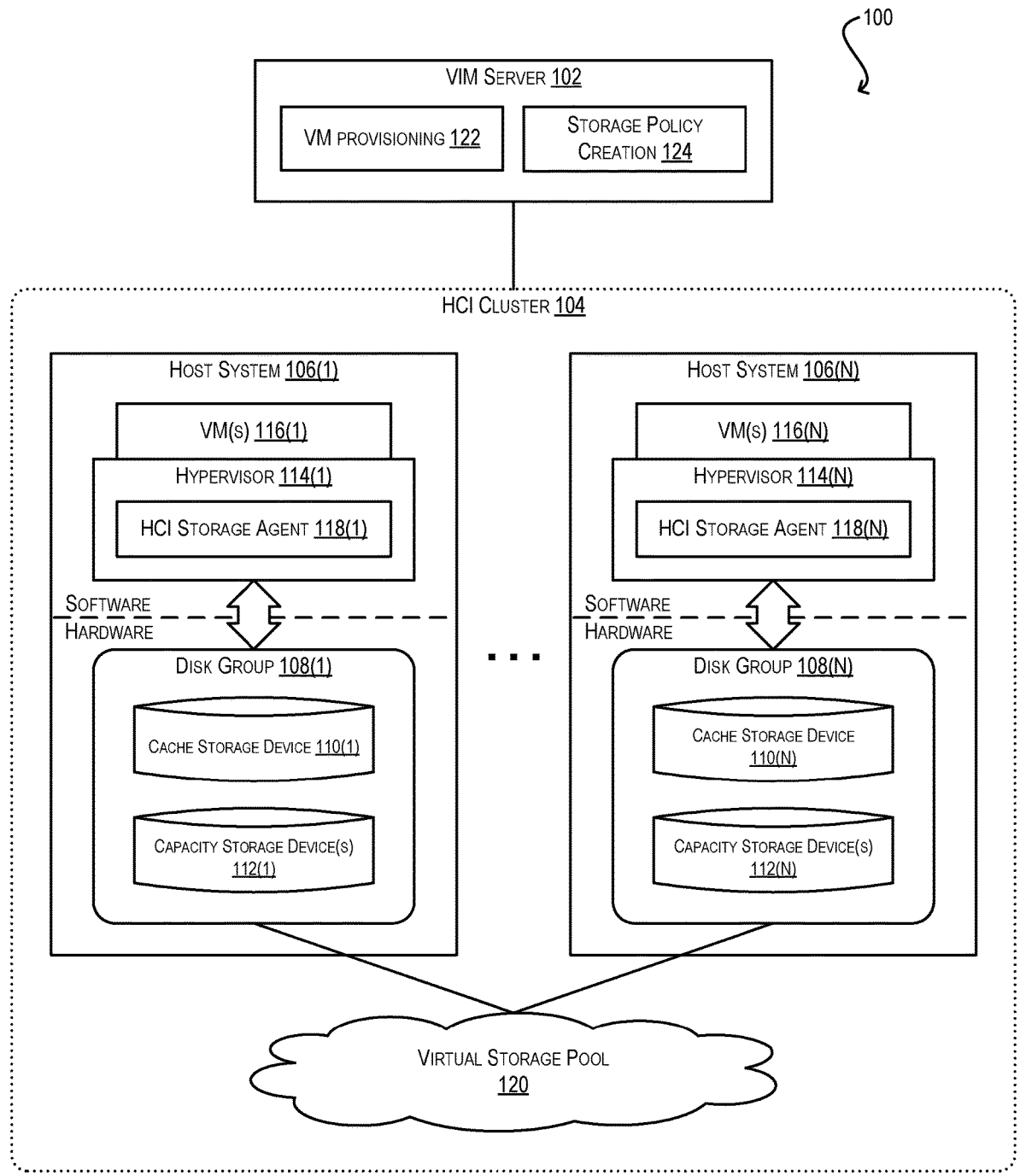
FIG. 1 depicts an example HCI environment.

FIG. 1 depicts an example HCI environment 100 in which embodiments of the present disclosure may be implemented. As shown, HCI environment 100 includes a virtual infrastructure management (VIM) server 102 that is communicatively coupled with an HCI cluster 104 comprising a plurality of host systems 106(1)-(N). VIM server 102 is a computer system or group of computer systems that is designated to manage the lifecycle and operation of HCI cluster 104 and its constituent components. For example, VIM server 102 may run an instance of VMware's vCenter Server or any other similar virtual infrastructure management software that supports HCI.

Each host system 106 of HCI cluster 104 includes one or more disk groups 108, which are logical groupings of physical storage devices that are locally attached to (e.g., installed in) host system 106. Each disk group 108 includes a cache storage device 110 for read caching and/or write buffering and one or more capacity storage devices 112 for persistent data storage. Because cache storage device 110 is solely used for caching purposes, the overall storage performance of a given disk group 108 is largely determined by the storage performance of its capacity storage device(s) 112.

In addition to disk groups, each host system 106 of HCI cluster 104 includes a hypervisor 114 running one or more VMs 116 and an HCI storage agent 118 within hypervisor 114. HCI storage agents 118(1)-(N) are configured to aggregate disk groups 108(1)-(N) of host systems 106(1)-(N) into a cluster-wide virtual storage pool 120 and make virtual storage pool 120 available to VMs 114(1)-(N) for data storage. It is assumed that HCI storage agents 118(1)-(N) manage the storage of data for each VM 114 within virtual storage pool 120—and thus, across disk groups 108(1)-(N)—as a collection of objects, where each object is composed of one or more components. Further, it is assumed that at the time a given VM is created (i.e., provisioned) in HCI cluster 104, a VM provisioning module 122 of VIM server 102 places the VM's objects/components (or in other words, "places the VM") in a distributed fashion across some subset of disk groups 108(1)-(N) according to one or more fault tolerance (FT) placement rules defined in a storage policy associated with the VM. For instance, this storage policy (which is created/defined via a storage policy creation module 124 of VIM server 102) can include an FT placement rule that requires RAID-1 data mirroring of each of the VM's objects across a certain number of fault domains (i.e., host systems). Once VIM server 102 has placed the VM on appropriate disk groups/host systems per the VM's storage policy, HCI storage agents 118(1)-(N) can work in concert to intercept storage read/write requests issued by the VM during its runtime and ensure that each request is routed to the disk group(s) where the data to be read or written is physically stored.

As mentioned in the Background section, existing HCI platform implementations—and more particularly, existing VIM servers such as VIM server 102 of FIG. 1—assume that all of the disk groups in an HCI cluster are composed of capacity storage devices that exhibit the same or largely similar performance characteristics, which causes the VIM server to treat the cluster's virtual storage pool as a single tier of storage. The problem with this approach is that the VIM server may place low priority (e.g., test/development) VMs with low storage performance requirements on the same disk groups as high priority (e.g., production) VMs with high storage performance requirements, because there is no difference (or at least no observable difference from the VIM server's perspective) in the performance capabilities of the cluster's disk groups. This can lead to a situation where the organization that owns the HCI cluster is forced to deploy expensive, high performance capacity storage devices in every disk group in order to meet the storage requirements of the high priority VMs, even though a significant percentage of the space in those expensive, high performance capacity storage devices will be consumed by the low priority VMs, resulting in suboptimal utilization of those resources.

Figure 2:
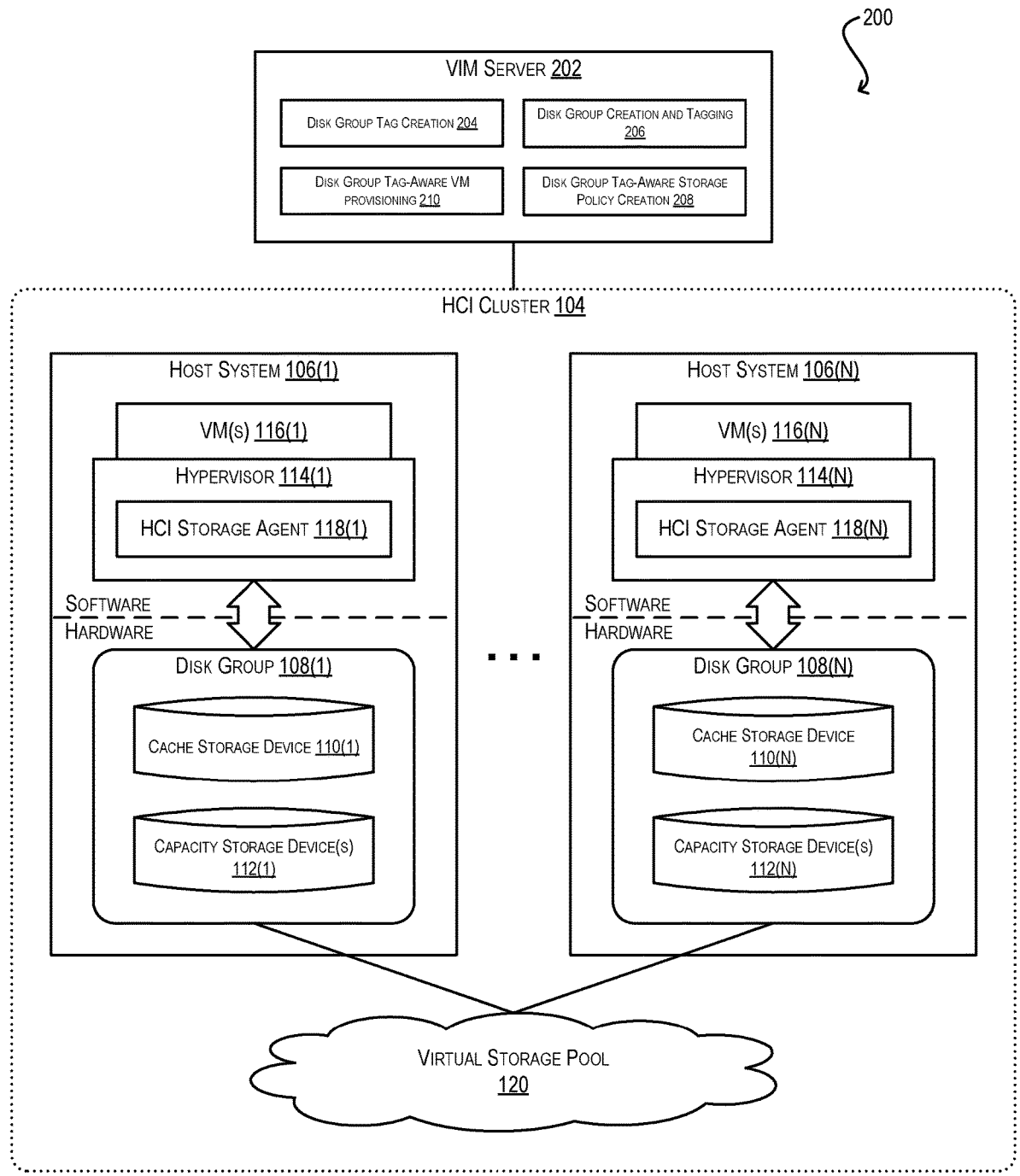
FIG. 2 depicts a modified version of the HCI environment of FIG. 1 according to certain embodiments.

To address the foregoing and other similar problems, FIG. 2 depicts a modified version of HCI environment 100 of FIG. 1 (i.e., HCI environment 200) that includes an enhanced VIM server 202 according to certain embodiments. As shown in FIG. 2, enhanced VIM server 202 comprises four modules: a disk group tag creation module 204, a disk group creation and tagging module 206, a disk group tag-aware storage policy creation module 208, and a disk group tag-aware VM provisioning module 210. At a high level, disk group tag creation module 204 can enable an administrator of HCI environment 200 to create disk group tags that are usable to identify different types of disk groups in HCI cluster 104 that have different levels of storage performance. For example, the environment administrator may use module 204 to create a "Slow-DG" disk group tag usable to identify disk groups that comprise low performance capacity storage devices (e.g., magnetic disks), a "Medium-DG" disk group tag usable to identify disk groups that comprise moderate performance capacity storage devices (e.g., PCIe-based SSDs), and a "Fast-DG" disk group tag usable to identify disk groups that comprise relatively high performance capacity storage devices (e.g., NVMe-based SSDs or PMEM modules).

Disk group creation and tagging module 206 can enable the environment administrator to define new disk groups on a per-host basis that include capacity storage devices of a particular type/performance level and to tag such new disk groups with appropriate disk group tags, as created using disk group tag creation module 204. For instance, assume that the environment administrator created the "Slow-DG," "Medium-DG," and "Fast-DG" disk group tags per the example above. In this case, the environment administrator can use disk group creation and tagging module 206 to define a first new disk group G1 on, e.g., host system 106(1) that includes only magnetic disks for its capacity storage devices and tag G1 with the "Slow-DG" disk group tag, define a second new disk group G2 on, e.g., host system 106(2) that includes only PCIe-based SSDs for its capacity storage devices and tag G2 with the "Medium-DG" disk group tag, and define a third new disk group G3 on, e.g., host system 106(3) that includes only NVME-based SSDs for its capacity storage devices and tag G3 with the "Fast-DG" disk group tag.

Disk group tag-aware storage policy creation module 208—which is an enhanced version of storage policy creation module 124 shown in FIG. 1—can enable the environment administrator to create VM-level storage policies that include, in addition to fault tolerance (FT) placement rules as mentioned above, new disk group tag placement rules that dictate the placement of VMs on disk groups in HCI cluster 104 that are tagged with (or not tagged with) specified disk group tags. For example, the environment administrator can use module 208 to create a storage policy P1 that includes a disk group tag placement rule requiring all VMs associated with P1 to be placed on disk groups tagged with the "Fast-DG" disk group tag. As another example, the environment administrator can use module 208 to create another storage policy P2 that includes a disk group tag placement rule requiring all VMs associated with P2 to be placed on disk groups that are not tagged with the "Fast-DG" disk group tag.

And disk group tag-aware VM provisioning module 210—which is an enhanced version of VM provisioning module 122 shown in FIG. 1—can enable VIM server 202 to automatically place a new VM, as part of the VM's provisioning workflow, on appropriate disk groups of HCI cluster 104 in accordance with the disk group placement tag rules included in the VM's associated storage policy (as well as in accordance with any other placement rules defined in the storage policy, such as FT rules). For instance, if the new VM is associated with storage policy P1 noted above, module 210 will cause VIM server 202 to automatically place the new VM on disk groups that have been tagged with the "Fast-DG" disk group tag. In cases where a new VM is associated with a storage policy that does not include any disk group tag placement rules, disk group tag-aware VM provisioning module 210 can cause VIM server 202 to place the VM on any combination of disk groups in HCI cluster 104 that is consistent with other placement rules included in the storage policy, with the caveat that all objects/components of the VM should be placed of disk groups of the same type/performance level (in order to avoid performance discrepancies in accessing the VM's various objects/components). Alternatively, module 210 can apply a default disk group tag placement rule to the VM that is defined at the cluster or environment level.

Figure 3:
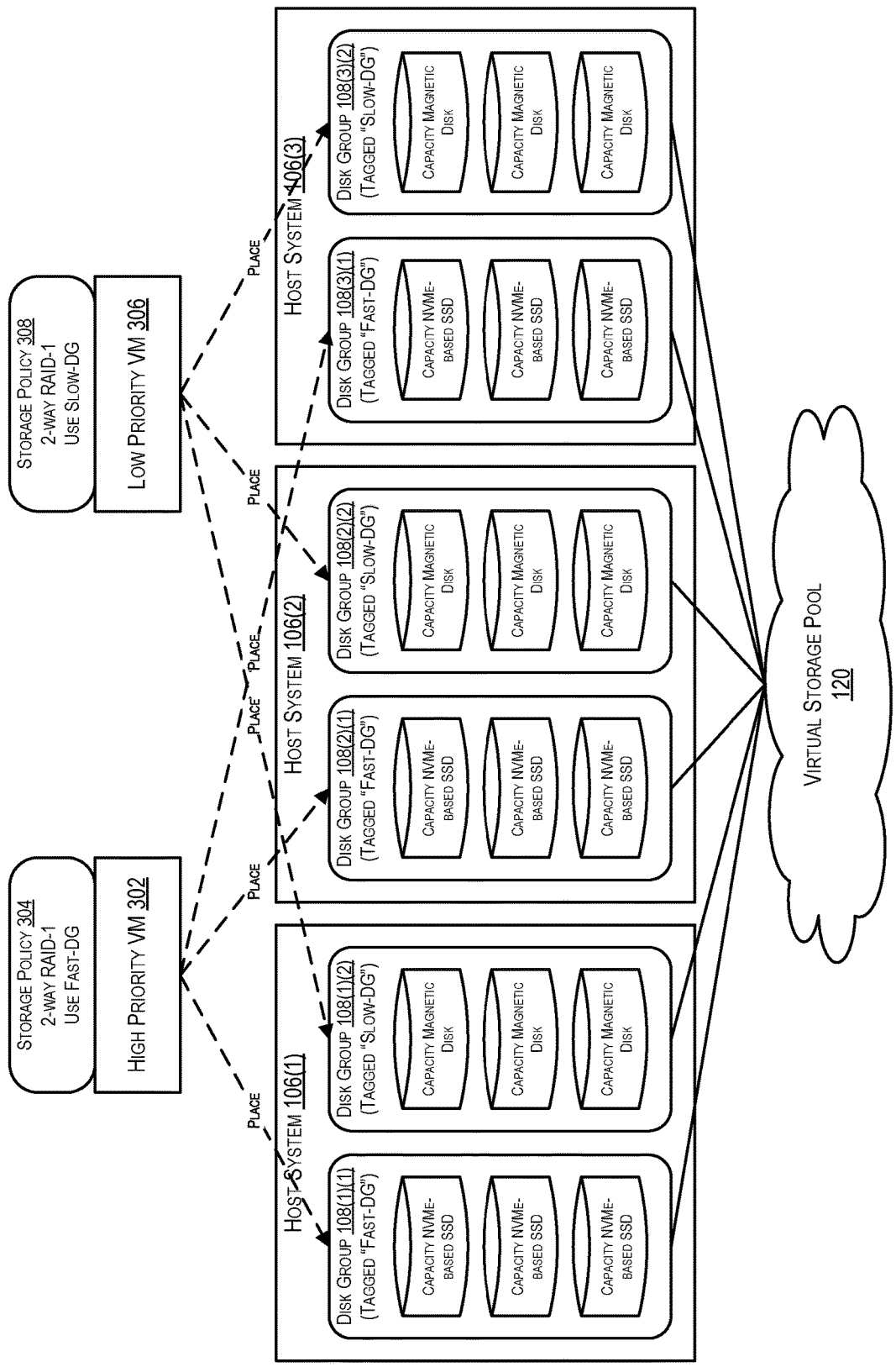
FIG. 3 depicts an example VM placement scenario according to certain embodiments.

With the combined functionality of modules 204-210, the administrator of HCI environment 200 can ensure that VIM server 202 places VMs on the disk groups of HCI cluster 104 that are best suited to the VMs' respective storage performance requirements, resulting in improved VM performance and/or more efficient utilization of the cluster's storage resources. To illustrate this, FIG. 3 depicts a scenario 300 in which HCI cluster 104 includes three host systems 106(1), 106(2), and 106(3), each with two disk groups 108(X)(1) and 108(X)(2). Disk groups 108(1)(1), 108(2)(1), and 108(3)(1) of host systems 106(1)-(3) each include three NVMe-based SSDs as capacity storage devices and is tagged with the "Fast-DG" disk group tag. In contrast, disk groups 108(1)(2), 108(2)(2), and 108(3)(2) of host systems 106(1)-(3) each include three magnetic disks as capacity storage devices and is tagged with the "Slow-DG" disk group tag.

In this scenario, assume that an administrator wishes to provision a high priority VM 302 in HCI cluster 104 that can tolerate up to one host failure and has high storage performance requirements, and thus associates VM 302 with a storage policy 304 including an FT placement rule specifying 2-way RAID-1 mirroring and a disk group tag placement rule specifying the "Fast-DG" tag. Further assume that the administrator wishes to provision a low priority VM 306 in HCI cluster 104 that can tolerate up to one host failure and has low storage performance requirements, and thus associates VM 306 with a storage policy 308 including an FT placement rule specifying 2-way RAID-1 mirroring and a disk group tag placement rule specifying the "Slow-DG" tag.

As illustrated in FIG. 3, the outcome of this configuration is that high priority VM 302 is automatically placed on the capacity NVMe-based SSDs of disk groups 108(1)(1), 108(2)(1), and 108(3)(1) (i.e., the disk groups tagged with the "Fast-DG" tag), which is consistent with VM 302's high storage performance needs. Two of these disk groups hold mirror copies of the data of VM 302 per the 2-way mirroring requirement noted above, and the third disk group holds a "witness component" that serves as a quorum in the event of a failure.

On the other hand, low priority VM 306 is automatically placed on the capacity magnetic disks of disk groups 108(1)(2), 108(2)(2), and 108(3)(2) (i.e., the disk groups tagged with the "Slow-DG" tag), which is consistent with VM 306's low storage performance needs. This placement also advantageously avoids having low priority VM 306 consume valuable storage space on the faster NVMe-based SSDs of disk groups 108(1)(1), 108(2)(1), and 108(3)(1)), which can instead be used to hold the data of additional high priority VMs that may be provisioned in the future.

It should be appreciated that FIGS. 1-3 are illustrative and not intended to limit embodiments of the present disclosure. For example, although FIG. 2 depicts a particular arrangement of modules within VIM server 202, other arrangements are possible (e.g., the functionality attributed to a particular module may be split into multiple modules, modules may be combined, etc.). Further, the various modules shown may include sub-modules and/or functions that are not specifically described. One of ordinary skill in the art will recognize other variations, modifications, and alternatives.

3. Disk Group Tag Creation

Figure 4:
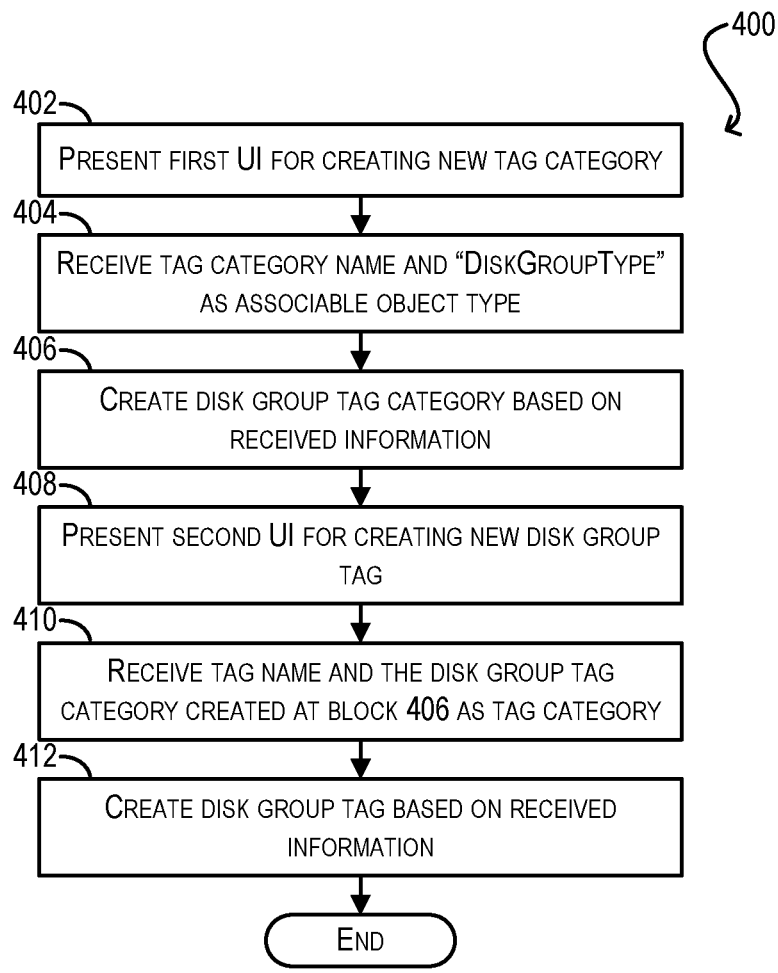
FIG. 4 depicts a disk group tag creation workflow according to certain embodiments.

FIG. 4 depicts a workflow 400 that may be executed by disk group tag creation module 204 of FIG. 2 for enabling an administrator of HCI environment 200 to create new disk group tags according to certain embodiments. Workflow 400 assumes that VIM server 202 supports the general notion of tagging objects/entities within HCI environment 200 via metadata tags that are associated with various tag categories.

Starting with block 402, module 204 can present to the environment administrator a first user interface (UI) for creating a new metadata tag category pertaining to disk groups. FIG. 5 depicts an example of this UI (500) that includes a category name field, a description field, a field for selecting the number of tags that can be defined per object (one tag or many tags), and a field for selecting one or more associable object types.

At blocks 404 and 406, module 204 can receive from the environment administrator appropriate values for the various fields of the first UI and use the received information to create a new disk group type tag category. For example, as shown in FIG. 5, module 204 may receive the category name "DiskGroupType" and a selection of the "DiskGroupType" object as the associable object type for this tag category, thereby indicating that it applies to disk groups.

Once the disk group tag category has been created, at the time the environment administrator wishes to create a specific disk group tag, module 204 can present to the environment administrator a second UI for tag creation (block 408). FIG. 6 depicts an example of this UI (600) that includes a tag name field, a description field, and a category field.

At blocks 410 and 412, module 204 can receive from the environment administrator appropriate values for the various fields of the second UI and use the received information to create a new disk group tag. For example, as shown in FIG. 6, module 204 may receive the tag name "Fast-DG" and a selection of "DiskGroupType" as the tag category, thereby indicating that this tag is a disk group tag. Blocks 408-412 can subsequently be repeated as needed to enable the creation of additional disk group tags.

4. Disk Group Creation and Tagging

Figure 7:
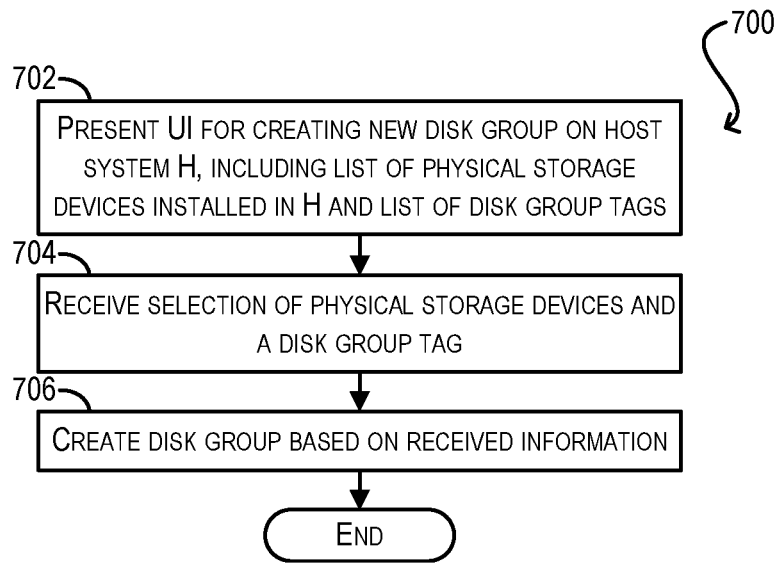
FIG. 7 depicts a disk group creation and tagging workflow according to certain embodiments.

FIG. 7 depicts a workflow 700 that can be executed by disk group creation and tagging module 206 of FIG. 2 for enabling an administrator of HCI environment 200 to create a new disk group on a particular host system H of HCI cluster 104 and to tag the newly-created disk group with a disk group tag according to certain embodiments.

Starting with block 702, module 206 can present to the environment administrator a disk group creation UI that includes, among other things, a list of physical storage devices installed in host system H that are not part of any existing disk group and a field for selecting a disk group tag from among the disk group tags previously created via module 204/workflow 400. As part of this UI, module 206 can display information regarding the type and/or characteristics of each storage device (magnetic disk, PCIe SSD, NVMe SSD, etc.) so that the environment administrator can easily identify the devices that have the same or similar storage performance.

At block 704, module 206 can receive from the environment administrator a selection of one or more physical storage devices from the list and a selection of a disk group tag. Module 206 can then create a new disk group for host system H that includes the selected physical storage devices as capacity storage devices and is tagged with the selected disk group tag (block 706), and can repeat blocks 702-706 as needed to enable the creation of additional disk groups.

Figure 8:
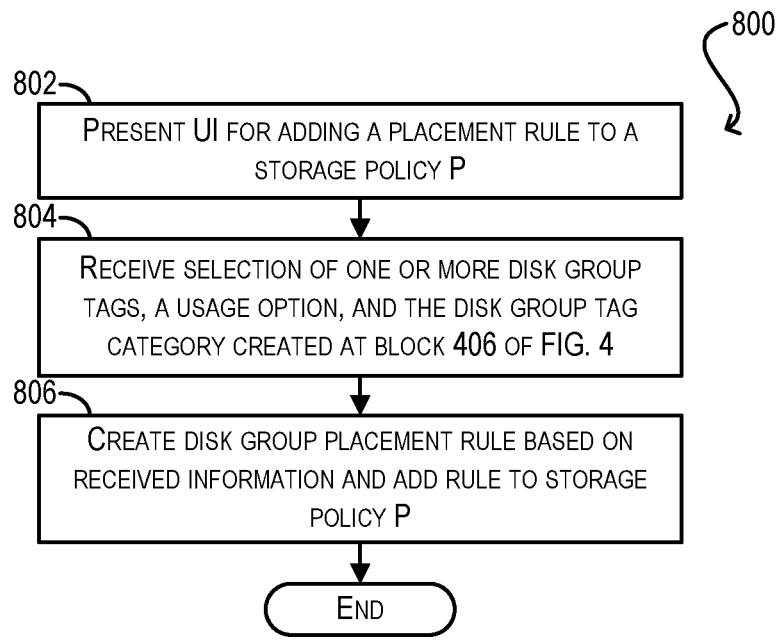
FIG. 8 depicts a storage policy creation workflow according to certain embodiments.

Although workflow 700 assumes that module 206 requires administrator input to identify the capacity storage devices to be included in a given disk group, in alternative environments module 206 can carry out this identification in a semi-automated manner. For example, in a particular embodiment module 206 can query (via, e.g., one or more storage protocol commands) hardware device information for the physical storage devices installed in host system H and, based on this hardware device information, automatically identify candidate disk groups comprising storage devices that are likely of the same type. Module 206 can then present these candidate disk groups to the environment administrator for confirmation and for tagging via appropriate disk group tags. 5. Storage Policy Creation with Disk Group Tag Placement Rules FIG. 8 depicts a workflow 800 that can be executed by disk group tag-aware storage policy creation module 208 of FIG. 2 for enabling an administrator of HCI environment 200 to create a new VM-level storage policy that includes one or more disk group tag placement rules according to certain embodiments.

Starting with block 802, module 208 can present to the environment administrator, as part of creating a storage policy P, a UI for adding a tag placement rule to policy P. FIG. 9 depicts an example of this UI (900) that includes a tag category field, a tags field, and a usage option field (which indicates how the tag(s) specified in the tags field should be used/applied for VM placement purposes). For instance, one such usage option (called, e.g., "use storage tagged with") may indicate that all VMs having policy P should only be placed on disk groups that are tagged with the tag(s) specified in the tags field. Another usage option (called, e.g., "do not use storage tagged with") may indicate that all VMs having policy P should not be placed on any disk groups that are tagged with the tag(s) specified in the tags field.

At block 804, module 208 can receive from the environment administrator a selection of the disk group tag category, a selection of an appropriate usage option, and a selection of one or more disk group tags. For example, as shown in FIG. 9, module 208 may receive the tag category name "DiskGroupType," the usage option "use storage tagged with," and the tag "Fast-DG," thereby indicating that all VMs having storage policy P should only be placed on disk groups that are tagged with the "Fast-DG" disk group tag.

Finally, at block 806, module 208 can create a disk group placement rule in accordance with the values received at block 804 and include the rule in storage policy P (along with any other placement rules defined for P). As mentioned previously, if a VM associated with storage policy P is subsequently provisioned in HCI cluster 104, disk group tag-aware VM provisioning module 210 will automatically place the VM's objects/components on disk groups that conform with the disk group tag placement rule created at block 906.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general-purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid-state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method for enabling multiple storage tiers in a hyperconverged infrastructure (HCI) cluster, the method comprising:
    creating, by a computer system, first and second pluralities of disk groups in the HCI cluster, wherein the HCI cluster comprises a plurality of host systems with locally-attached physical storage devices, wherein the locally-attached physical storage devices are aggregated into a virtual storage pool that is made available to virtual machines (VMs) running on the plurality of host systems for data storage, wherein each disk group in the first plurality of disk groups comprises a subset of the locally-attached physical storage devices that are of a first type, and wherein each disk group in the second plurality of disk groups comprises another subset of the locally-attached physical storage devices that are of a second type;
    tagging, by the computer system, each disk group in the first plurality of disk groups with a first disk group tag;
    tagging, by the computer system, each disk group in the second plurality of disk groups with a second disk group tag;
    creating, by the computer system, a first virtual machine (VM)-level storage policy that includes a first placement rule identifying the first disk group tag and one or more second placement rules corresponding to one or more VM fault tolerance requirements;
    associating, by the computer system, the first VM-level storage policy with a VM to be provisioned in the HCI cluster; and
    at a time of provisioning the VM in the HCI cluster, placing, by the computer system, persistent data of the VM on one or more of the first plurality of disk groups in accordance with the first and second placement rules included in the first VM-level storage policy associated with the VM.

2. The method of claim 1 further comprising:
    creating a second VM-level storage policy that includes a second placement rule identifying the second disk group tag;
    associating the second VM-level storage policy with another VM to be provisioned in the HCI cluster; and
    at a time of provisioning said another VM in the HCI cluster, placing, by the computer system, persistent data of said another VM on one or more of the second plurality of disk groups in accordance with the second placement rule included in the second VM-level storage policy associated with said another VM.

3. The method of claim 1 wherein the subset of the locally-attached physical storage devices of the first plurality of disk groups exhibit a first level of storage performance and wherein said another subset of the locally-attached physical storage devices of the second plurality of disk groups exhibit a second level of storage performance different from the first level of storage performance.

4. The method of claim 3 wherein the first disk group tag indicates the first level of storage performance and wherein the second disk group tag indicates the second level of storage performance.

5. The method of claim 3 wherein the first level of storage performance corresponds to a level of storage performance required by the VM.

6. The method of claim 1 wherein the persistent data of the VM is not placed on any of the second plurality of disk groups.

7. The method of claim 1 wherein at least one disk group in the first and second pluralities of disk groups is determined automatically by the computer system by:
    querying hardware device information of one or more locally-attached physical storage devices of a host system of the HCI cluster; and
    grouping, based on the hardware device information, the one or more locally-attached physical storage devices into the at least one disk group.

8. A non-transitory computer readable storage medium having stored thereon program code executable by a computer system, the program code embodying a method for enabling multiple storage tiers in a hyperconverged infrastructure (HCI) cluster, the method comprising:
    creating first and second pluralities of disk groups in the HCI cluster, wherein the HCI cluster comprises a plurality of host systems with locally-attached physical storage devices, wherein the locally-attached physical storage devices are aggregated into a virtual storage pool that is made available to virtual machines (VMs) running on the plurality of host systems for data storage, wherein each disk group in the first plurality of disk groups comprises a subset of the locally-attached physical storage devices that are of a first type, and wherein each disk group in the second plurality of disk groups comprises another subset of the locally-attached physical storage devices that are of a second type;
    tagging each disk group in the first plurality of disk groups with a first disk group tag;
    tagging each disk group in the second plurality of disk groups with a second disk group tag;
    creating a first virtual machine (VM)-level storage policy that includes a first placement rule identifying the first disk group tag and one or more second placement rules corresponding to one or more VM fault tolerance requirements;
    associating the first VM-level storage policy with a VM to be provisioned in the HCI cluster; and
    at a time of provisioning the VM in the HCI cluster, placing persistent data of the VM on one or more of the first plurality of disk groups in accordance with the first and second placement rules included in the first VM-level storage policy associated with the VM.

9. The non-transitory computer readable storage medium of claim 8 wherein the method further comprises:
    creating a second VM-level storage policy that includes a second placement rule identifying the second disk group tag;
    associating the second VM-level storage policy with another VM to be provisioned in the HCI cluster; and
    at a time of provisioning said another VM in the HCI cluster, placing persistent data of said another VM on one or more of the second plurality of disk groups in accordance with the second placement rule included in the second VM-level storage policy associated with said another VM.

10. The non-transitory computer readable storage medium of claim 8 wherein the subset of the locally-attached physical storage devices of the first plurality of disk groups exhibit a first level of storage performance and wherein said another subset of the locally-attached physical storage devices of the second plurality of disk groups exhibit a second level of storage performance different from the first level of storage performance.

11. The non-transitory computer readable storage medium of claim 10 wherein the first disk group tag indicates the first level of storage performance and wherein the second disk group tag indicates the second level of storage performance.

12. The non-transitory computer readable storage medium of claim 10 wherein the first level of storage performance corresponds to a level of storage performance required by the VM.

13. The non-transitory computer readable storage medium of claim 8 wherein the persistent data of the VM is not placed on any of the second plurality of disk groups.

14. The non-transitory computer readable storage medium of claim 8 wherein at least one disk group in the first and second pluralities of disk groups is determined automatically by the computer system by:
querying hardware device information of one or more locally-attached physical storage devices of a host system of the HCI cluster; and
grouping, based on the hardware device information, the one or more locally-attached physical storage devices into the at least one disk group.

15. A computer system comprising:
a processor; and
a non-transitory computer readable medium having stored thereon program code that, when executed, causes the processor to:
create first and second pluralities of disk groups in a hyperconverged infrastructure (HCI) cluster, wherein the HCI cluster comprises a plurality of host systems with locally-attached physical storage devices, wherein the locally-attached physical storage devices are aggregated into a virtual storage pool that is made available to virtual machines (VMs) running on the plurality of host systems for data storage, wherein each disk group in the first plurality of disk groups comprises a subset of the locally-attached physical storage devices that are of a first type, and wherein each disk group in the second plurality of disk groups comprises another subset of the locally-attached physical storage devices that are of a second type;
tag each disk group in the first plurality of disk groups with a first disk group tag;
tag each disk group in the second plurality of disk groups with a second disk group tag;
create a first virtual machine (VM)-level storage policy that includes a first placement rule identifying the first disk group tag and one or more second placement rules corresponding to one or more VM fault tolerance requirements;
associate the first VM-level storage policy with a VM to be provisioned in the HCI cluster; and
at a time of provisioning the VM in the HCI cluster, place persistent data of the VM on one or more of the first plurality of disk groups in accordance with the first and second placement rules included in the first VM-level storage policy associated with the VM.

16. The computer system of claim 15 wherein the program code further causes the processor to:
create a second VM-level storage policy that includes a second placement rule identifying the second disk group tag;
associate the second VM-level storage policy with another VM to be provisioned in the HCI cluster; and
at a time of provisioning said another VM in the HCI cluster, place persistent data of said another VM on one or more of the second plurality of disk groups in accordance with the second placement rule included in the second VM-level storage policy associated with said another VM.

17. The computer system of claim 15 wherein the subset of the locally-attached physical storage devices of the first plurality of disk groups exhibit a first level of storage performance and wherein said another subset of the locally-attached physical storage devices of the second plurality of disk groups exhibit a second level of storage performance different from the first level of storage performance.

18. The computer system of claim 17 wherein the first disk group tag indicates the first level of storage performance and wherein the second disk group tag indicates the second level of storage performance.

19. The computer system of claim 17 wherein the first level of storage performance corresponds to a level of storage performance required by the VM.

20. The computer system of claim 15 wherein the persistent data of the VM is not placed on any of the second plurality of disk groups.

21. The computer system of claim 15 wherein at least one disk group in the first and second pluralities of disk groups is determined automatically by the processor by:
querying hardware device information of one or more locally-attached physical storage devices of a host system of the HCI cluster; and
grouping, based on the hardware device information, the one or more locally-attached physical storage devices into the at least one disk group.

* * * * *